Oct. 19, 1965  R. H. CAMPBELL  3,212,977
CONTROL ROD POSITION INDICATING APPARATUS AND METHOD
Filed June 23, 1960  2 Sheets-Sheet 1
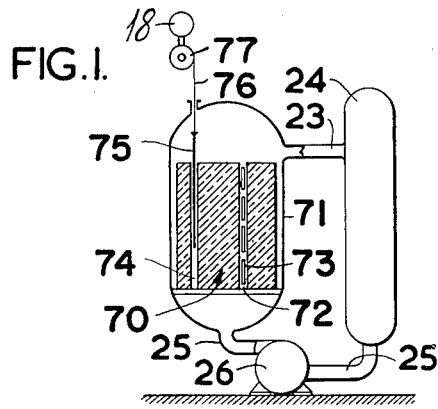
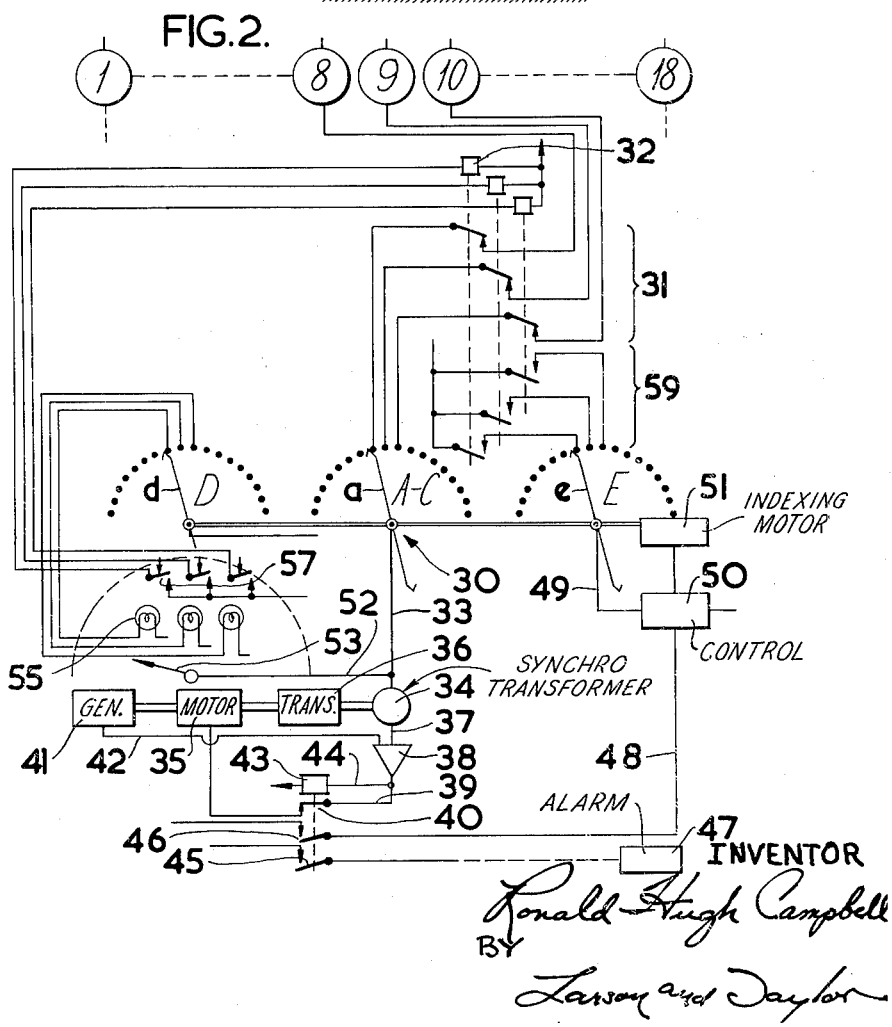
INVENTOR
Ronald Hugh Campbell
BY
Larson and Taylor Oct. 19, 1965  R. H. CAMPBELL  3,212,977
CONTROL ROD POSITION INDICATING APPARATUS AND METHOD
Filed June 23, 1960  2 Sheets-Sheet 2

INVENTOR
Ronald Hugh Campbell
BY
Larson and Taylor

United States Patent Office 3,212,977
Patented Oct. 19, 1965

3,212,977
CONTROL ROD POSITION INDICATING
APPARATUS AND METHOD
Ronald Hugh Campbell, Bowden, England, assignor to United Kingdom Atomic Energy Authority, London, England
Filed June 23, 1960, Ser. No. 38,316
Claims priority, application Great Britain, July 6, 1959, 23,107/59
10 Claims. (Cl. 176—24)

This invention relates to apparatus for monitoring the positions of a number of members movable simultaneously. The invention has particular application to the monitoring of the positions of control rods in a nuclear reactor.

It is the current practice in nuclear reactor operation to move most of the control rods in a nuclear reactor in unison from a single three-phase feeder common to all control rod driving motors. The positions of the control rods are indicated individually to the control operator by providing a position transmitter for each control rod which operates a receiver and indicator in the reactor control room. In such an arrangement (one indicator per control rod) the number of indicators becomes very large such that the control operator is never readily aware of any indicator which shows an inconsistency with all the others.

According to the present invention, apparatus for monitoring the positions of a number of simultaneously adjustable members comprises means to scan the positions of the members step by step in a cyclically repeated sequence, a synchro transformer or the like with a rotatable core, a servo loop for driving the core in response to an error signal proportional to the difference between the signal applied to the transformer, representing the position of the adjustable member being scanned, and the position of the core, representing the position of the adjustable member scanned immediately preceding, and an alarm means to indicate when the error signal exceeds a predetermined level.

A "synchro transformer or the like" in the present context is to be understood to mean a device having a first input representative of the position of a position transmitter, a movable element representative by its disposition of a reference position, and an output related to the difference between the two positions.

A synchro control is an electromechanical device having an electrical 3-wire input representative of the angular position of a position transmitter, a rotary element or shaft providing a reference angular position and an A.C. output related to the angular difference between the two positions. The shaft may be connected directly to operate the indicator so that the angular position of the reference is always presented.

The invention will be further described by way of example with reference to one particular embodiment applicable to a nuclear reactor having eighteen coarse control rods of neutron absorbing material for insertion into the reactor core, it being desired that in respect of these rods the similarity of position relative to the core is monitored. This particular embodiment is illustrated by the accompanying drawings in which:

FIG. 1 shows diagrammatically those parts of a typical nuclear reactor as are necessary to an understanding of the present invention.

FIG. 2 is a block and circuit diagram of the control rod monitor apparatus, and

Figure 3:
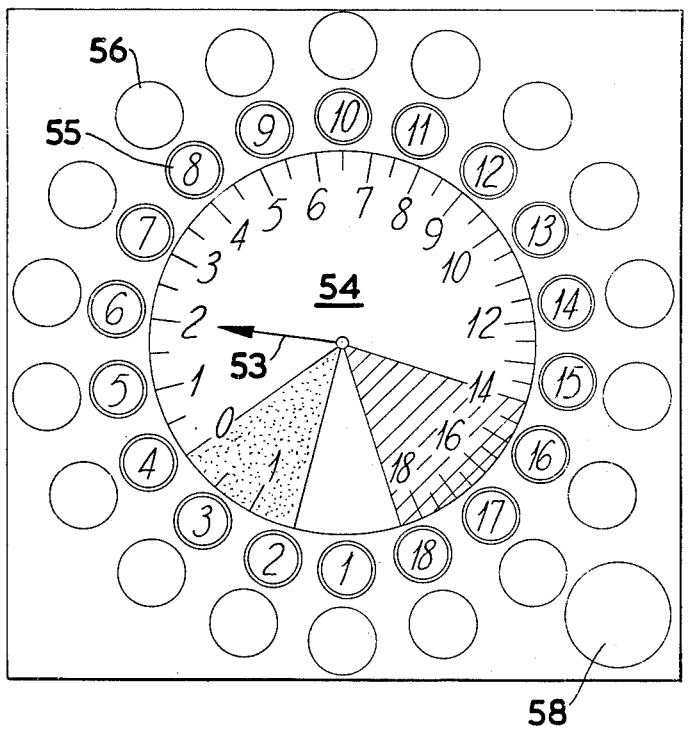
FIG. 3 shows a suitable display dial for use with the apparatus of FIG. 2.

Referring to FIG. 1, a nuclear reactor core structure designated generally 70 is supported in a pressure vessel 71. The core structure is penetrated by a number of fuel element channels 72 (only one being shown) containing superposed fuel elements 73. Also penetrating the core structure are a number of control rod channels 74 (only one being shown) each equipped with a coarse control rod 75 of neutron absorbing material suspended from a cable 76 attached to a winch and motor unit 77. Each such unit has a drive connection to a respectively associated position transmitter in the form of a synchro or magslip device denoted 18 for registering steplessly and continuously the position of the respective control rod, it being assumed for the convenience of subsequent description that the illustrated control rod is in fact assigned the number 18.

The reactor coolant is assumed to be carbon dioxide and is circulated upwards through the reactor core structure and thence, externally of the pressure vessel, over a closed path composed of a duct 23, a steam generator 24 to which water for steam raising is supplied, and a duct 25 having a circulator 26. A number of similar gas coolant circuits are normally provided, only one being shown in this instance.

The eighteen synchros (FIG. 2) associated respectively with the control rods 75 have their outputs connected to respective contacts of an electro-mechanical stepping device taking the form, in the present example, of a uniselector or rotary selector switch designated generally 30. Each output connection is composed of three wires as will be understood by those versed in the art of position transmitting synchros, but for simplicity of illustration only a single connection is shown, it being understood that the uniselector affords three banks of contacts (shown as one bank denoted A–C) for those output connections. Interposed in each output connection are contacts 31 of an individual relay, such as 32, provided for a purpose to be explained subsequently.

From the wiper arms, such as $a$, of the three banks A–C of uniselector contacts just mentioned an input connection 33 (likewise composed of three wires) is made to a synchro control transformer 34. A shaft or rotor constituting a conventional component of such a synchro control transformer is driven from an electric motor 35 through a gear box 36. The synchro transformer 34 has an output connection 37 leading to a non-thermionic (e.g. transistor) amplifier 38 and provides in known manner an alternating current error signal proportional to the angular difference between, on the one hand, the prevailing position of the control transformer shaft and, on the other hand, the position represented by the incoming signal being fed into the control transformer from the uniselector banks A–C. The amplifier 38 together with the control transformer output connection forms part of a servo loop which is completed by a connection 39 over relay contacts 40 to the motor 35, the effect of this loop being to render the control transformer null-seeking in that the amplified error signal causes the motor to drive the control transformer shaft in the direction to eliminate the error. In order to stabilise the servo loop against overrun of the motor 35, a tachometer generator 41 is in driven connection with the motor and provides a stabilising feed to the amplifier 38 over a connection 42.

The relay contacts 40 appertain to an alarm relay 43 receptive of the control transformer error signal over a branch connection 44 and pre-set or chosen to energized in response to an error signal in excess of a predetermined level. The contacts 40 are normally closed, but on energisation of the relay are opened; two other sets of contacts 45 and 46 appertaining to the alarm relay 43 have an opposite characteristic in that they are closed by energisation of the relay. The contacts 45 are disposed in a circuit to a remotely situated alarm means 47 which on completion of the circuit by closure of the contacts 45 initiates an audible or visual alarm which will attract the attention of an operator. The contacts 46 are disposed in the first of two control connections 48 and 49 of an indexing motor control device 50 which is arranged to control a uniselector indexing motor 51. This control device 50 is responsive to current supplied over the connection 48 by closure of the relay contacts 46 to bring the normal intermittent drive of the indexing motor 51 to a standstill.

A branch connection 52 is taken from the input connection 33 of the control transformer to actuating mechanism of a dial pointer 53 which therefore registers against a dial face 54 (seen in greater detail in FIG. 3) a numerical indication of the position of the control rod whose position is being scanned at the time, assumed in the case of FIG. 2 to be rod No. 8 as signified by the engagement of the wiper $a$ with contact 8 of the bank A–C. Referring more especially to FIG. 3, it will be seen that the dial face 54 is calibrated numerically, the numbers from 0 to 18 in the present instance indicating the distance in feet of the control rods from the lowermost extremity of the normal travel. A distinctively coloured sector below the zero digit provides for registration of overtravel of the control rods into a broach section which is used to arrest the rods when they are dropped in an emergency. At the other end of the scale another sector is distinctively coloured to make clear the region in which the control rods are above the reactor core.

Encircling the dial face 54 is a ring of lamp bulbs, such as 55, each corresponding to a respective control rod and bearing the number assigned to the resceptive rod. From FIG. 2 it will be seen that a fourth contact bank D of the uniselector has its contacts so arranged in the individual circuits of these bulbs that as a wiper $d$ sweeps step by step over the contacts the bulbs are illuminated in turn to indicate the particular control rod whose position is being scanned at the time.

The ring of lamp bulbs is encircled by a ring of push buttons, such as 56, which are depressible to close switch contacts, such as 57 (FIG. 2). These push button switches are latched so that when once a depression has been effected the contacts 57 closed thereby remain closed until such time as the latch is released by depression of a cancel push button 58 at the lower right hand corner of the dial panel; the release occurs on all contacts 57 which happen to be closed at the time. The location of the push buttons 56 adjacent the numbered lamps bulbs 55 identifies these buttons with the corresponding control rods; they serve by means of circuitry now to be described to enable by-passing of a control rod location in the event, for example, that the location is not in use or is being serviced.

Each of the push button switches 57 (FIG. 2) controls a respective one of the relays 32 mentioned previously such that the relay is energized in response to the switch contacts being closed. The relay contacts 31 interposed respectively in the output connections from the synchros 1 to 18 are normally closed but energisation of any of the relays 32 causes the appertaining contacts 31 to be opened. Additional contacts 59 are provided on each of the relays 32 and these are interposed in individual feeds to the contacts of a fifth bank E of the uniselector, a wiper $e$ for this bank being connected to the control connection 49 of the indexing motor control device 50. This device is responsive to current fed thereto in the event of the wiper $e$ engaging a contact in the bank E in respect of which the contacts 59 are closed to cause the indexing motor 51 to drive on the uniselector wipers immediately to the next contact so that in effect the contact in question is passed over, the contacts 59 being of opposite characteristic to the contacts 31 in that they are normally open but are closed by energisation of the relay.

With the control rods stationary and all in the same relative position, the scanning in numerical order of the positions of the control rods as represented by the synchros 1 to 18 which is performed in repeated cycles by the uniselector results in a uniform input to the synchro control transformer 34 over the connection 33 and a steady state condition pertains in which the pointer 53 remains steadily registering on the dial face 54 the distance appropriate to the common rod position as the lamps 55 illuminate in turn and there is no error signal produced over the output connection 37 from the synchro control transformer 34.

In the case where the control rods are moving into or out of the core in proper synchronism, for the duration of each dwell of a scanning step, typically 30 seconds, a continuous change of input over the connection 33 to the control transformer 34 will take place and results in the slight amount of error signal over the output connection which is necessary to maintain the shaft of the control transformer following the change smoothly; the display pointer 53 will behave similarly. The transition time between one scanning step and the next is inevitably finite so that between steps the shaft of the control transformer will be left behind momentarily and a greater error signal will result at the commencement of the next scanning step. However, the level at which the alarm relay 43 becomes energised in fact discriminates as to magnitudes of the error signal which amount to normal disconformity between steps and abnormal disconformity. In the present instance the alarm would not become energised.

However, if one of the control rods fails to move (because, for example, its winch and motor unit 17 ceases to function) whilst the other rods continue to move, an abnormally high error signal occurs at the commencement of the scanning step for the defective rod location and the alarm relay 43 becomes energised. The consequent closing of the relay contacts 45 causes the alarm means to give a warning to the operator, and the closing and opening respectively of the relay contacts 46 and 40 brings the uniselector indexing drive to a standstill and discontinues following by the shaft of the synchro control transformer. The situation as now presented to the operator is that a warning is being given, one of the lamps 55 indicating the disconforming rod is illuminated, and the pointer 53 registers the rod's position.

The apparatus may be set in normal operation once more by depressing the appropriate one of the push button switches 56, 57, to by-pass the rod location which has given rise to the alarm. The corresponding one of the relays 32 is then energised and by closure of its contacts 59 restarts scanning, but in cycles omitting a dwell in respect of the by-passed location, and by opening of its contacts 31 disconnects the position transmitting synchro for the location in question from the uniselector banks A–C. When the discomforming rod has been rectified, the scanning of its position is reintroduced into the cycle by depressing the cancel button 58 thereby unlatching the contacts 57 and de-energising the relay 32.

If flux flattening in the reactor core requires intentional misalignment of certain of the control rods, all of the control rods or at least a selection corresponding to those likely to be intentionally misaligned are provided with a follow-through transmitter, now more commonly known as a synchro control differential, interposed between the respective position transmitting synchro and the uniselector banks A–C. Such a differential has a rotary element or shaft similar to the synchro control transformer 34 which shaft is set manually as desired to modify the input passed through the uniselector banks A–C to the synchro control transformer. This setting facility can therefore be utilised to compensate for intentional misalignment.

From the foregoing description, it will be appreciated that the invention also affords, in controlling the generation of nuclear power, a method of testing for disconformity of position in a number of synchronously adjustable reactor control rods which comprises the steps of scanning the positions of the individual control rods in a cyclically repeated step by step sequence providing for a dwell of uniform duration at each scanning step, maintaining a common rotatable core positioned angularly in following relationship with the position of the control rod whose position is being scanned at the time, and, between consecutive scanning steps, discriminating as to differences between core position and scanned rod position which amount to positional disconformity above a tolerable limit.

I claim:

1. Apparatus for monitoring the similarity of position of a plurality of simultaneously adjustable members comprising a plurality of adjustable members, means for adjusting the positions of said members individually and simultaneously, means operatively connected with each said member for producing an electrical output signal representative of the position of the member with which the means is connected, receiver means for receiving signals from said signal producing means and generating an error signal proportional to the difference between said signal and a reference, selector switch means for serially connecting each said signal producing means with said receiver means, means for sensing the error signal generated by said receiver means and for varying said receiver means reference to eliminate said error signal, and means actuated by an error signal of predetermined magnitude.

2. Apparatus as set forth in claim 1, said last mentioned means having alarm means operatively connected thereto.

3. Apparatus as set forth in claim 1, and indicator means for receiving output signals from said selector switch means and indicating the position of a said member in response to the magnitude of said output signal, said indicator means further including means for indicating the position of said selector switch means and consequently the particular adjustable member the position of which is being sensed.

4. Apparatus as set forth in claim 1, said last mention means having means connected therewith for stopping the movement of said switch means upon actuation thereof by a said error signal of predetermined magnitude, and selectively operable means for causing operation of said selector switch means through cycles omitting the selector switch means position corresponding to the adjustable member the position of which produced the said error signal.

5. Apparatus as set forth in claim 1, said receiver means and error signal generating means comprising a synchro transformer.

6. Apparatus for testing for disconformity of position of a plurality of simultaneously movable members comprising means for scanning the positions of the individual members in a cyclically repeated sequence, means connected with said scanning means for producing an output proportional to the positional disconformity between pairs of consecutive members in the cyclic sequence, and means for sensing the magnitude of the said output.

7. A method testing for disconformity of position in a number of neutron control members movable simultaneously into and out of a nuclear reactor core comprising scanning the positions of the individual members in a cyclically repeated sequence, deriving a signal representative of positional disconformity between pairs of consecutive members in the cyclic sequence, and sensing values of the signal which represent positional disconformity above a tolerable limit.

8. A method of testing for disconformity of position in a number of simultaneously adjustable members which comprises scanning the positions of the individual members in a cyclically repeated step by step sequence providing for a dwell of uniform duration at each scanning step, setting a common position indicator element in accordance with the position of the member whose position is scanned during the dwell, deriving a signal representative of disconformity at the beginning of each dwell between the position of the common position indicator and the position of the member scanned during the dwell, and sensing values of the signal which are in excess of a predetermined level representative of a tolerable limit of positional disconformity.

9. A method of testing for disconformity of position in a number of synchronously adjustable members which comprises scanning the positions of the individual members in a cyclically repeated step by step sequence providing for a dwell of uniform duration at each scanning step, setting a common rotary element to maintain same positioned angularly in following relationship with the position of the member whose position is being scanned at the time, and discriminating as to differences between element position and scanned member position which amount to positional disconformity above and below a tolerable limit.

10. Apparatus as set forth in claim 3 wherein the first-mentioned indicator means is constituted by a rotary pointer and dial, and the second mentioned indicator means is constituted by a ring of lamps numbered corresponding to appertaining members and encircling said dial, means being included to illuminate said lamps in sequence and in synchronism with said switch means.

References Cited by the Examiner

UNITED STATES PATENTS

| 1,194,808 | 8/16 | Barry | 340—181 |
| 2,696,604 | 12/54 | Markow | 304—187 |
| 2,780,800 | 2/57 | Lauler | 304—187 |

OTHER REFERENCES

AEC Document: NYO–8503, Digital Rod Position Indicator System, Dec. 2, 1957, 21 pages (particularly pertinent are pages 6, 7, and 14–21).

CARL D. QUARFORTH, *Primary Examiner.*

LEON D. ROSDOL, REUBEN EPSTEIN, *Examiners.*